United States Patent
Haczynski et al.

[11] Patent Number: 5,841,105
[45] Date of Patent: Nov. 24, 1998

[54] AUTOMATIC MIG WELDING TORCH AND METHOD OF ASSEMBLY

[75] Inventors: Christopher Haczynski, Monee; Glen Jones, Wilmington, both of Ill.

[73] Assignee: Delaware Capital Formation, Inc., Wilmington, Del.

[21] Appl. No.: 585,621

[22] Filed: Jan. 16, 1996

[51] Int. Cl.[6] .................................................. B23K 9/173
[52] U.S. Cl. .................. 219/137.31; 219/124.02
[58] Field of Search .................. 219/137.31, 124.01, 219/124.02, 124.03, 137.44, 137.62, 137.63

[56] References Cited

U.S. PATENT DOCUMENTS

| | | | |
|---|---|---|---|
| 3,059,098 | 10/1962 | Anderson | 219/124.03 |
| 3,265,856 | 8/1966 | Cecil | 219/137.31 |
| 3,469,070 | 9/1969 | Bernard et al. | |
| 3,514,570 | 5/1970 | Bernard et al. | |
| 3,544,758 | 12/1970 | dal Molin | 219/137.63 |
| 3,576,423 | 4/1971 | Bernard et al. | |
| 3,728,514 | 4/1973 | Bernard et al. | |
| 3,783,233 | 1/1974 | dal Molin . | |
| 4,645,901 | 2/1987 | Scholz et al. | |
| 4,656,329 | 4/1987 | Moerke . | |
| 5,366,392 | 11/1994 | Raloff et al. | |
| 5,384,447 | 1/1995 | Raloff et al. | |
| 5,451,117 | 9/1995 | Lajoie . | |

OTHER PUBLICATIONS

Binzel America, Ltd. dated 1982.
DF Machine Specialities, Inc. catalog for mechanized and robotic welding products dated 1982.
DF Machine Specialities, Inc. catalog for MIG, TIG and SAW welding products available to the public prior to Jan. 16, 1996.
Section of Hobart Brothers Company catalog on water-cooled automatic MIG torches available to the public prior to Jan. 16, 1996.
Instructions for Linde MT–500R MIG Welding Robot Torch dated May 1983.
Page from Linde MIG Welding Equipment catalog showing Mechanized MIG Torches available to the public prior to Jan. 16, 1996.
OXO Equipment Co, Inc. flyer of MT–500 Machine Automated Water Cooled MIG Gun available to the public prior to Jan. 16, 1996.
Tweco Products, Inc. catalog entitled "Automatic & Robotic MIG–Guns & Accessories" dated 1993.
Tweco Products, Inc. brochure identified as Form No. BRO–A/R–93 (Aug. 1993) dated 1993.
Tweco catalog entitled "TAM" MIG–Guns and Tri–Just Fixture dated Jan. 1984.
GULLCO brochure for Variable Speed Travel Carriage available to the public prior to Jan. 16, 1996.
Bernard® catalog entitled EZ Feed II MIG Guns available to the public prior to Jan. 16, 1996.
Bernard® catalog entitled "E–Z Feed 160 . . . " dated Jun. 1, 1985.
Bernard® Operations Manual entitled "EZ Feed II MIG Guns" Form No. EZ II–4–5 available to the public prior to Jan. 16, 1996.

(List continued on next page.)

*Primary Examiner*—Clifford C. Shaw
*Attorney, Agent, or Firm*—Brinks Hofer Gilson & Lione

[57] ABSTRACT

An improved automatic MIG welding torch assembly for use in automated welding environments includes a locking feature to provide an anti-rotational fit between a power adapter and a conductive inner body tube of a welding torch. The conductive inner body tube has a hollow body and a hexagonal shaped external circumference extending along at least a portion of the body tube. An outer tube for use in an automatic MIG welding assembly has a hollow body with at least one end having a polygonal cross-section. A pitch rack is detachably connected to the outer tube with at least two non-threaded fasteners. The outer body tube may also include a smoke exhaust integrally connected to the tube. Improved methods for assembling an automatic MIG welding torch and manufacturing the integral smoke exhaust are also provided.

29 Claims, 6 Drawing Sheets

OTHER PUBLICATIONS

Bernard® catalog entitled "Bernard EZ Feed II MIG Guns" Form No. EZ II–2–3–350 available to the public prior to Jan. 16, 1996.

Bernard® catalog entitled "Parts Breakdown EZ Feed G, H, & F MIG Guns" Form G–H–F available to the public prior to Jan. 16, 1996.

Bernard® Form No. 160K entitled "160 AMP Gun Adaptor Kit Utilization Chart" dated Dec. 1, 1985.

Bernard® Form No. EZA–2 entitled "Bernard E-Z Feed Adaptor System" dated Oct. 1, 1984.

Bernard® Operations Manual entitled "Water Cooled MIG Guns" Form EZ–WC–1191 dated Nov. 1, 1991.

Bernard® catalog entitled "Clean Air MIG Guns" available to the public prior to Jan. 16, 1996.

Bernard® catalog entitled "Guns and Cables for Robotic and Automatic MIG Applications" Form No. AGS–2, dated Jan. 1, 1986.

Bernard® catalog entitled "Bernard MIG Guns & Cable Assemblies" Form No. SG–S1 dated Jan. 15, 1984.

Page from Tweco Products, Inc. catalog entitled "RDM Adapter Plates" dated 1995.

Portion of Tweco Products, Inc. catalog entitled "QTR™ Quick Tube Robotics Torches & Accessories" available to the public prior to Jan. 16, 1996.

Page from Alexander Binzel catalog showing Robo–End Effector available to the public prior to Jan. 16, 1996.

Alexander Binzel Corp. brochure of Robotic Torch Mount 'A' available to the public prior to Jan. 16, 1996.

Alexander Binzel Corp. brochure of '"ATS–CAT" Torch Mount' available to the public prior to Jan. 16, 1996.

Tregaskiss brochure entitled Tough Gun™ available to the public prior to Jan. 16, 1996.

Alexander Binzel Corp. brochure of "Welding Gun Roboc 241" available to the public prior to Jan. 16, 1996.

AUTOMATIC MIG WELDING TORCH AND METHOD OF ASSEMBLY

BACKGROUND OF THE INVENTION

The present invention relates to an automatic MIG welding torch. More particularly, the present invention relates to an improved welding torch having easily interchangeable parts and greater functionality in addition to an improved method of assembly.

Automatic metal inert gas (MIG) welding torches are specifically designed to be used in an automated welding environment. In automatic or machine welding, the work piece to be welded may be stationary while the automatic torch is moved mechanically along a weld joint. Alternatively, the work piece may be moved under a stationary automatic torch. Generally, automatic MIG torches utilize consumable wire electrodes fed from a spool in a separate wire feeder. Also, the torches require shielding gas and electric current to perform the welding tasks. Wire feeders used to feed the MIG wire may be located remotely, requiring an automatic torch with a welding cable end fitting, or the feeder may be located directly above the automatic torch assembly such that a direct plug between the torch and the feeder is necessary.

The direct plug fitting or cable end fitting used to connect the conductive inner body tube of a welding torch to the supplies of shielding gas, MIG wire electrode and electricity presents several challenges to welding torch manufacturers. Automatic MIG welding torch manufacturers must be able to connect to any one of several types of power, shielding gas and wire electrode supplies presently used by automatic MIG torch users. The different wire electrode feeders available each may have a different connector that requires a customized direct plug or cable end assembly to work with the welding torch. Also, the connection between the conductive inner body tube of the welding torch assembly and these direct plug or cable end fittings has a tendency of loosening during operation of the product due to the heat, vibration, torque, and impacts experienced in ordinary use.

The welding industry has used several methods to secure direct plug and cable end fittings to a conductive inner body tube. One approach is to proceed with tightly screwing the plug fitting to the body tube. The heat generated by the welding process and any torque on the automatic welding torch often defeats this form of attachment. Another method is to manufacture a single piece combination body tube and direct plug for every possible direct plug type. While effective, this method limits the ability to update and change direct plug types in the field. A single piece combination of body tube and plug fitting would require stocking multiple types of conductive inner tubes for different jobs because of the multiple types of direct plugs used in welding applications. Further, interior components of the body tube are inaccessible in a single piece design and, should a portion fail or wear out, a new body tube must be purchased.

Similar to the method of creating a single piece conductive inner body tube and plug fitting, another attempt to secure the components together is to braze separately machined inner body tubes to separately machined direct plug fittings. Again, the ability to update and change direct plug fittings in the field is eliminated and the entire inner body tube must be discarded if a portion of it fails or wears out. Users of automated MIG welding torches also attempt to secure the direct plug fitting to the inner body tube with cross drilled set screws to bind the threads of the body tube and plug fitting together. This method eliminates the interchangeability problem associated with the above method, but generally does not lock the threads securely enough and, in a short time, tends to destroy the threads and the components.

Another component of a welding torch which can wear out in typical use is a connection of a pitch rack to the outer housing of an automatic torch. The pitch rack is generally fastened to the outer housing of a MIG torch in a longitudinal direction. The pitch rack, when placed in a external motorized assembly, allows the automatic torch to be adjusted in a linear direction. Presently, pitch racks are attached to the outer housings of automatic torches using plastic or metal screws. Plastic screws tend to deform under the heat and the stress of regular use, as well as shear off prematurely under a torque condition. Metal screws, due to the presence of a high current conductor, require an external sleeve to be attached over the outer housing of the torch. The metal screws also tend to have a different thermal expansion property than the housing and therefore loosen and become lost during extended use of the automatic torch.

Existing conductive inner body tubes for automatic welding torches are generally round and subject to unwanted rotation within round insulators inside the welding torch when in use. Conductive inner body tubes having a thin round cross section also tend to lack column strength such that they may bend easily when impacted. Additionally, the thinner round tubes may concentrate the heat generated at the electrode end of the body tube and lead to unnecessary wear of consumables.

The conductive inner body tube of an automatic welding torch is often connected to a cylindrical outer tube by metal or plastic screws. The outer tube cooperates with the pitch rack and industry standard mounting equipment, commonly known as seam tracking units, to allow the automatic torch to be moved. The outer tube is often subject to rotational torque loads when in operation. Many presently manufactured cylindrical outer tubes both require extra fasteners and are subject to rotation due to the shape of the body tube.

Existing automatic MIG welding torches are often constructed as a single piece having an inner conductor, an outer tube, and a single insulator positioned around the entire inner conductor and isolating the inner conductor from the outer tube. Because of this type of design, disassembly and part replacement may be difficult or non-feasible. Further, smoke and particulate matter collectors, for drawing potentially toxic or polluting fumes from a work piece, are difficult to integrate into the welding torch assembly. Generally, automatic MIG welding torches do not offer a smoke collector. The automatic welding torches that do offer smoke collection tend to simply include a vacuum hose tied to the welding torch assembly. Additionally, the tools and methods of integrating an exhaust port on a welding torch often require special machinery in the manufacturing process.

Accordingly, there is a need for an automatic welding torch assembly which allows for adaptability and interchangeability of fittings while creating secure connections between components. Further, there is a need for an improved pitch rack fastening system to allow for more resilient connections between an outer housing and pitch rack. An automatic welding torch assembly with a strengthened anti-rotational conductive inner body tube and an anti-rotational outer tube is also desirable. Finally, a smoke collector that is integral with the outer tube of the welding torch assembly would be desirable. Fabrication of the smoke collection feature with minimal tooling and manufacturing steps would also be advantageous.

SUMMARY OF THE INVENTION

The present invention provides for an improved automatic MIG welding torch and method of assembly for use by welders in automated welding environments. Additionally, this invention provides a simplified method of manufacture of a portion of an automatic MIG welding torch. An embodiment of the present invention includes a conductive inner body tube that is positioned inside an outer tube. The conductive inner body tube has a power connection end and a welding tip end. At least one insulator is positioned between the outer tube and the conductive inner body tube. Also, a locking mechanism is located at the power connection end of the inner body tube to securably and releasably connect the inner body tube to a power adapter. Preferably the locking mechanism has a lock ring and a lock ring bushing.

According to another aspect of this invention a conductive inner body tube for use in an automatic MIG welding assembly is provided. The inner body tube has a hollow body with a power connection end and a welding tip end. The hollow body also includes an inner circumference extending axially from the power connecting end to the welding tip in addition to a hexagonal shape external circumference that extends along at least a portion of the exterior of the inner body tube. In one embodiment, the conductive inner body tube has a hexagonal exterior shape and increased mass for increased strength, improved anti-rotational performance, greater heat sinking properties and lower resistivity.

An outer tube for use in an automatic MIG welding assembly is disclosed. The outer tube preferably has a hollow body with a substantially cylindrical shape and two open ends. At least one of the open ends has a polygonal cross-section such that the outer tube forms an anti-rotational fit over the electrical insulator positioned inside the outer tube and between the outer tube and the conductive inner body tube. In a preferred embodiment, the polygonal cross-sectional shape is a hexagon. In another preferred embodiment, the outer tube includes a pitch rack mounted longitudinally along the exterior of the outer tube using at least two non-threaded fasteners. The non-threaded fasteners may be aluminum rivets.

According to another aspect of the present invention, an automatic MIG welding torch assembly is provided having an outer tube, a conductive inner body tube positioned inside the outer tube, and first and second non-conductive spacers separating the inner and outer tubes. An airflow passage is defined by the inner diameter of the outer tube and the outer diameter of the inner body tube. The first spacer is positioned at a power connection end, and the second spacer is positioned at a welding tip end. Also, an exhaust port is positioned in the outer tube such that the exhaust port connects the airflow passage with an exhaust system.

A method for attaching a smoke exhaust to an outer tube is also provided in another preferred embodiment. The method includes providing a two-piece punch and an anvil. A user places the anvil inside an outer tube to have a smoke exhaust attached, and places the two-piece punch in a coped pipe that will be the smoke exhaust when attached. Using a standard hydraulic press or manual arbor press, a user forces the two-piece press through the smoke exhaust pipe to be attached to the outer tube and, withdraws the handle of the punch after the punch ring has passed through the outer wall of the outer tube and fallen into a cylindrical cavity in the anvil. The anvil is then simply removed from the outer tube containing the punch ring, and the punch handle is removed from the smoke exhaust.

DETAILED DESCRIPTION OF THE PRESENTLY PREFERRED EMBODIMENTS

Figure 1:
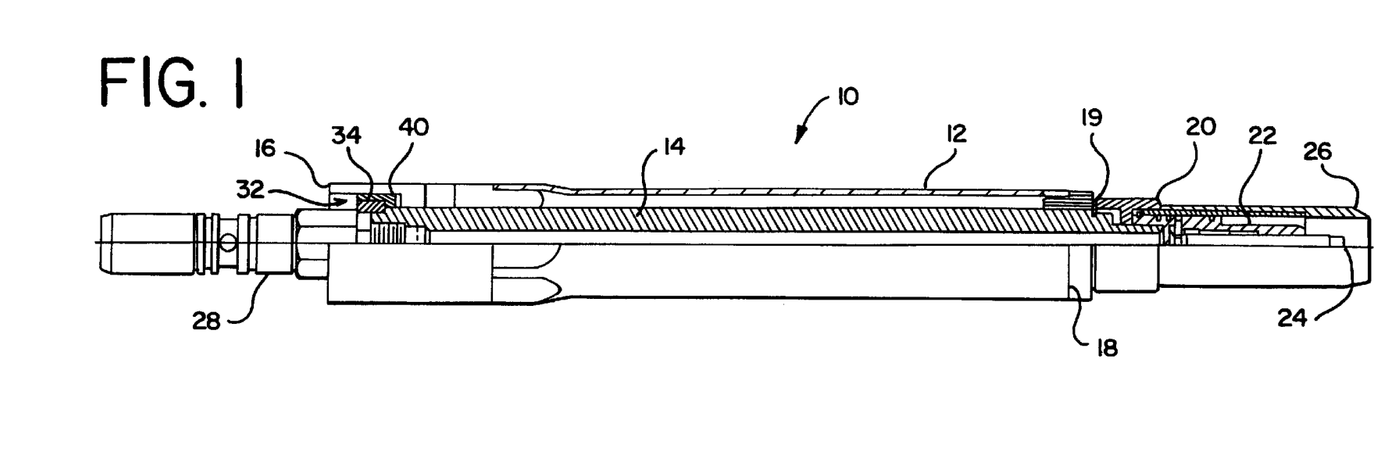
FIG. 1 illustrates a partial cutaway side view of a preferred automatic MIG welding torch.
Figure 2:
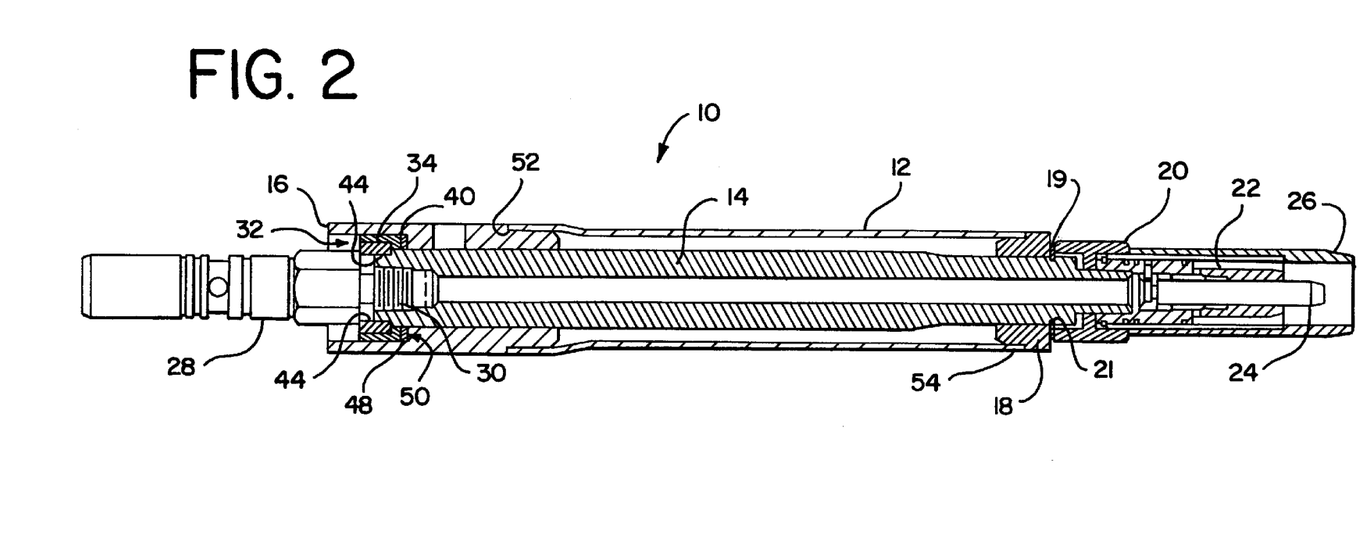
FIG. 2 is a cross-sectional view of the automatic MIG welding torch assembly of FIG. 1.

FIGS. 1 and 2 illustrate a preferred embodiment of an automatic metal inert gas (MIG) welding torch assembly 10. FIG. 1 shows a partial cutaway view of the welding torch assembly 10 with a hollow outer tube 12 surrounding a coaxially positioned conductive inner body tube 14. The outer tube 12 is preferably electrically isolated from the conductive inner body tube 14 by a rear housing 16 positioned at the power connection end of the inner body tube and a front spacer 18 positioned towards the welding tip end of the inner body tube. Both the rear housing 16 and front spacer 18 are preferably constructed of an electrically insulating and heat resistant material. The rear housing and spacer are preferably positioned such that at least a portion of each is positioned between the outer tube and the inner body tube.

As best shown in FIGS. 1 and 2, the front spacer 18 is held in place in the axial direction by a removable retaining ring 19 positioned in an annular groove 21 in the inner body tube 14. The retaining ring may be an external snap ring such as those manufactured by TRUARC, Inc. and commonly available from other sources. A cap 20 is interposed between the retaining ring 19 and a welding head 22. The cap 20 acts to insulate the electrically live metal of the inner body tube behind the welding head. The welding head 22 diffuses the shielding gas coming through the inner body tube and surrounds a contact tip 24 that guides a metal wire electrode (not shown) to a work piece. A nozzle 26 surrounds the welding head and contact tip. Generally, the cap 20, welding head 22, contact tip 24 and nozzle 26 are referred to as the consumable components of a welding torch. These consumables are referred to as such due to the abbreviated life span they typically have as a result of the tremendous heat and impact they may experience when the automatic MIG welding torch assembly is in use.

Figures 3, 4:
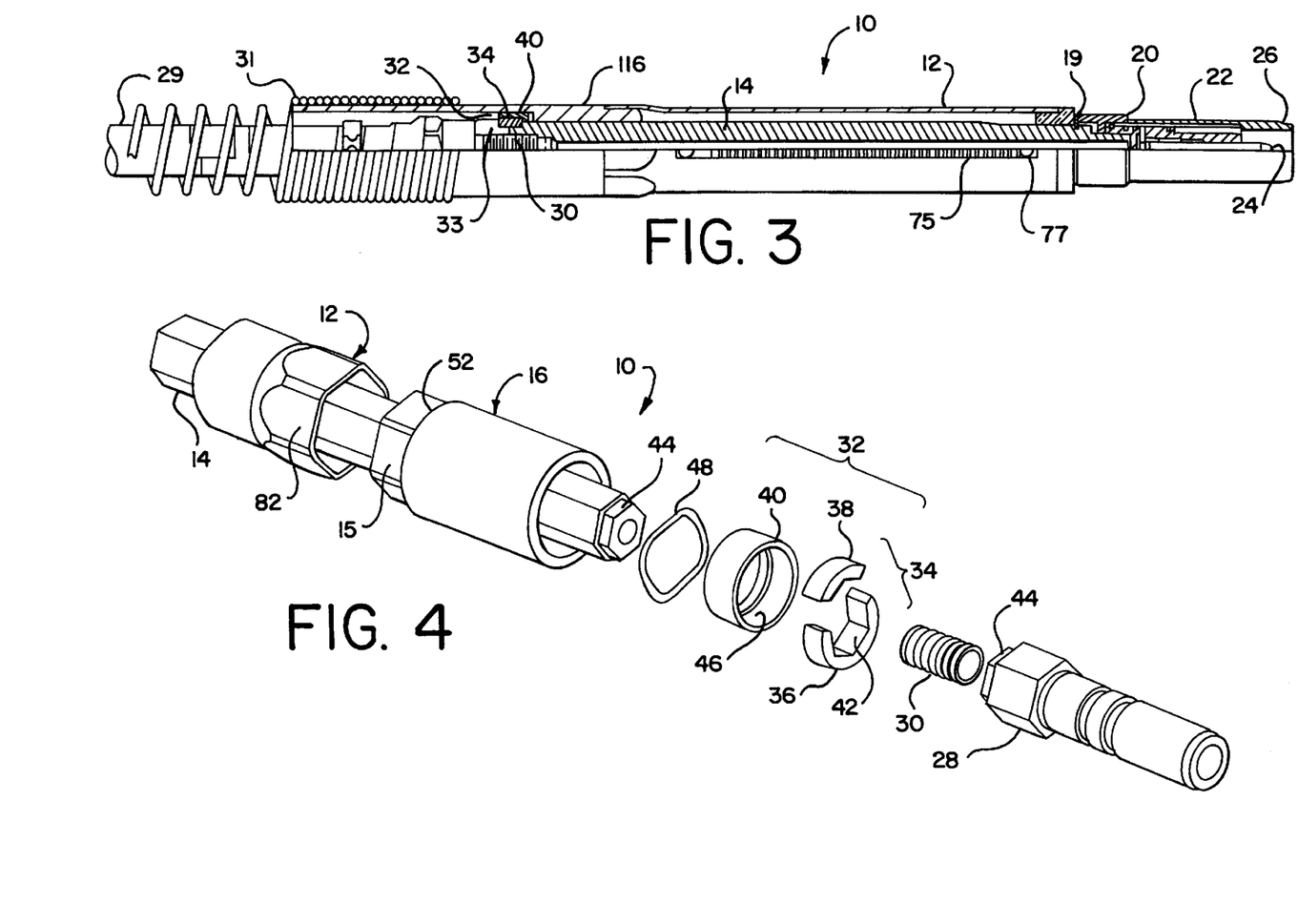
FIG. 3 is an illustration showing a partial cutaway side view of a preferred automatic MIG welding torch assembly having a cable assembly adapter.
FIG. 4 is an exploded perspective view of the power connection end of the automatic MIG welding torch assembly of FIG. 1.

Referring to FIGS. 2–4, the welding torch assembly 10 receives electrical current, shielding gas and metal wire through a power adapter. The power adapter may be a direct plug 28 type of power adapter or a cable end fitting subassembly 29 (see FIG. 3). In order to receive power, gas and wire from any one of a number of commercially available power, gas and wire supplies, the automatic MIG welding torch assembly 10 is preferably designed to accept one of a number of interchangeable power adapters. A power adapter, such as a direct plug 28 power adapter, preferably connects to the conductive inner body tube 14 via a threaded close nipple 30. The power adapter is kept securely and releasably connected to the inner body tube by a locking mechanism 32.

Similarly, in applications requiring a cable end fitting subassembly 29, the same locking mechanism 32 may be used to releasably and securely connect the cable end fitting 29 to the inner body tube 14. Shown in FIG. 3, the cable subassembly 29 is preferably supported by a strain relief spring 31 attached to a modified electrically insulating rear housing 116 to spread the bending strain on the assembly 29 over a wider area. As with the direct plug, the cable end fitting 29 has a conductive inner body tube connecting end 33 that connects with the inner body tube 14 via the locking mechanism 32.

A preferred locking mechanism 32 is made up of a lock ring 34 and a lock ring bushing 40. Referring to FIG. 4, the lock ring preferably comprises two sections 36, 38. The inner circumference 42 of the lock ring 34 is preferably designed to fit over the recessed circumferential area 44 on the connecting ends of the power adapter 28 and the inner body tube 14. The lock ring bushing 40 is slidably movable over the shaft of the inner body tube and is sized to slidably and frictionally fit over the external circumference of the lock ring 34. When a user slides the lock ring bushing 40 over the lock ring 34, the sections 36, 38 of the lock ring are securely held together in the recessed circumferential area 44 by the lock ring receiving area 46 of the lock ring bushing. When assembled, and in locked position, the locking mechanism 32 prevents the power adapter 28 from rotating with respect to the inner body tube thereby maintaining a good electrical contact between the power adapter and the inner body tube and preventing damage to the threads of the inner body tube power adapter and close nipple. A spring, preferably an annular wave spring 48, abuts the lock spring bushing 40.

As shown in FIG. 2, the wave spring 48 is sandwiched between the lock ring bushing 40 and the interior annular wall 50 of the rear housing 16. The wave spring 48 takes up any excess slack between the components assembled axially along the inner body tube 14. Specifically, the wave spring preferably acts as a tensioning device to hold the spacer 18, outer tube 12, and rear housing 16 firmly against the retaining ring 19 on one end and the locking mechanism 32 on the other. In this manner, these various axially movable components of the welding torch assembly 10 are maintained in a steady position and the lock ring bushing of the locking mechanism is held in place. Additionally, a user may disassemble or assemble the welding torch assembly 10 with a minimal number of fasteners and tools. A suitable wave spring is generally available from Smalley Steel Ring Co. and other manufacturers.

In a preferred embodiment, a user may assemble the automatic MIG welding torch assembly by first attaching a power adapter such as a direct plug 28 to the conductive inner body tube 14. The locking mechanism 32 is assembled by placing the sections 36, 38 of the lock ring 34 in the recessed circumferential area 44 created by the joinder of the power adapter and inner body tube, and sliding the lock ring bushing 40 over the assembled sections 36, 38. The wave spring 48 is positioned adjacent to the rear of the lock ring bushing, and the rear insulator housing 16 is positioned over the wave spring and assembled locking mechanism 32 by sliding the rear housing 16 along the inner body tube 14 until the lock ring receiving cavity 50 in the rear housing 16 is snugly against the wave spring 48 and overlapping the locking mechanism 32. A user next slides the outer tube 12 over the inner body tube 14 until the outer tube fits against the retaining ridge 52 of the rear insulator housing 16. The user slides the front spacer 18 along the inner body tube until the end of the outer body tube rests against the retaining ridge 54 on the front spacer 18.

Applying a small longitudinal force against the spacer 18 in the direction of the power plug 28, a user compresses the wave spring 48 and may place a retaining ring 19 into the annular groove on the inner body tube 14. After the user releases longitudinal pressure against the front spacer, the wave spring pushes the assembled components back against the retaining ring 19 such that there is no slack between any of the assembled components. Finally, a user may then add the consumables such as the cap, head, nozzle and contact tip and then hook up the power, gas and wire electrode supplies. Disassembly of the automatic MIG welding torch assembly 10 is accomplished in the reverse manner.

FIGS. 5A through 5D illustrate a preferred embodiment of the conductive inner body tube 14. The inner body tube 14 preferably has a hollow body with an inner circumference 64 extending axially from the power connection end 60 to the welding tip end 62. The conductive inner body tube 14 also preferably includes a non-circularly shaped external circumference 66 extending along at least a portion of the length of the inner body tube. A preferred shape of the external circumference 66 is polygonal, such as a hexagon shape. In one preferred embodiment, the thickness and mass of the inner body tube is sufficient to act as a heat sink for the consumable components attached at the welding tip end 62 of the assembled automatic MIG welding torch 10. The increased mass and thickness of the walls of the inner body tube, act to both increase the thermal heat sinking properties and reduce electrical resistivity.

Figure 5A:
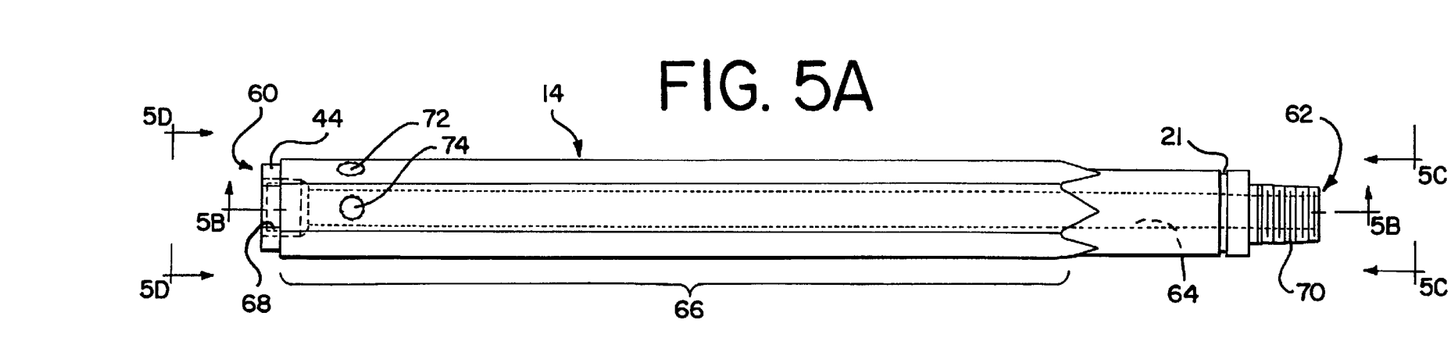
FIG. 5A is a side elevational view of a preferred conductive inner body tube for use with the automatic MIG welding torch assembly of FIG. 1.
Figure 5B:
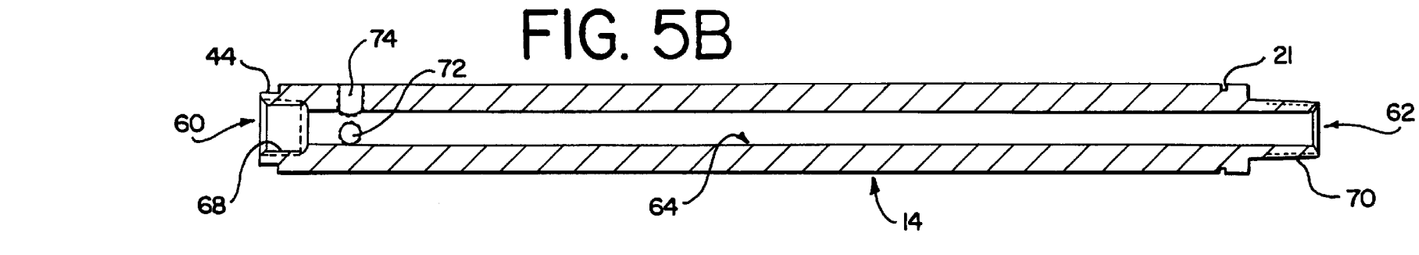
FIG. 5B is a cross-sectional view of the conductive inner body tube taken along line 5B—5B of FIG. 5A.
Figure 5C:
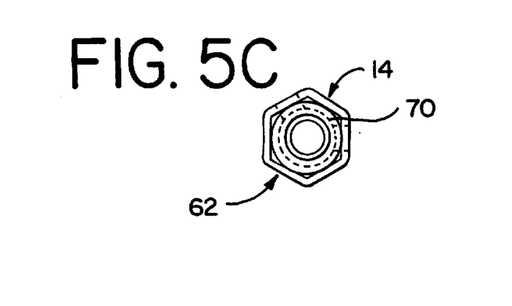
FIG. 5C is an end view of the conductive inner body tube taken along line 5C—5C of FIG. 5A.
Figure 5D:
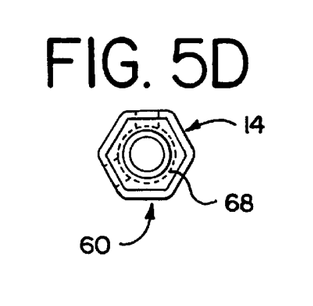
FIG. 5D is an end view of the conductive inner body tube taken along line 5D—5D of FIG 5A.

The hexagonal shaped external circumference 66, in combination with the added thickness and mass of the inner body tube 14, provide the advantage of added strength in the longitudinal direction over the typically round and thin body tubes used in the industry. This added strength is important for withstanding various impacts that may occur during normal use. The power connector end 60 of the inner body tube preferably comprises an internally threaded area 68 for receiving a threaded connector. The welding tip end 62 preferably comprises an externally threaded area 70 for connecting to a welding head and a nozzle. Further, the welding tip end 62 also includes an annular groove 21 for receiving a retaining ring. As shown in FIGS. 5A and 5B, the inner body tube 14 may also include an anti-spatter gas port 72 and a shielding gas port 74 connecting the hollow passage, or inner circumference 64, to the outside, or external circumference. Depending on the welding application and the power adapter used, these ports 72, 74 may be required to externally supply gas or fluid to the welding tip or work piece.

FIGS. 6A through 6D best show a preferred outer tube 80. The outer tube 80 of FIGS. 6A–6D differs from the outer tube 12 of FIGS. 1–4 in that a smoke collection exhaust port 84 is also included. The outer tube 80 preferably has a hollow body having a substantially cylindrical shape and two open ends. One or both of the open ends may have a polygonal cross section 82 so that an anti-rotational friction fit may be created between the outer tube 80 and the insulator separating the outer tube 80 from a conductive inner body tube. The polygonal cross section 82 is preferably a hexagonal shape. In another preferred embodiment, the entire length of the outer tube may have a polygonal cross section. In addition to the advantage of an anti-rotational fit over an electrical insulator, the polygonal cross section at the end of the outer tube provides flat areas for a wrench to be applied by a user to aid in assembly and disassembly of the automatic MIG welding torch.

Figure 7A:
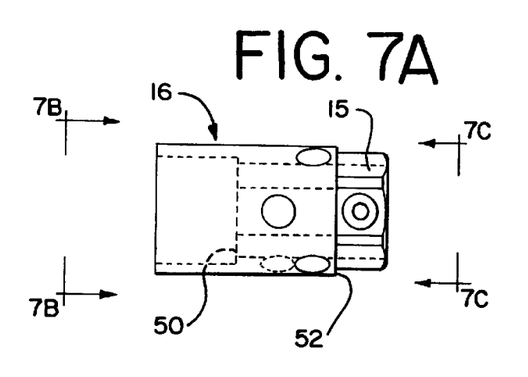
FIG. 7A is a side elevational view of a preferred rear housing for use with the automatic MIG welding torch assembly of FIG. 1.
Figure 7B:
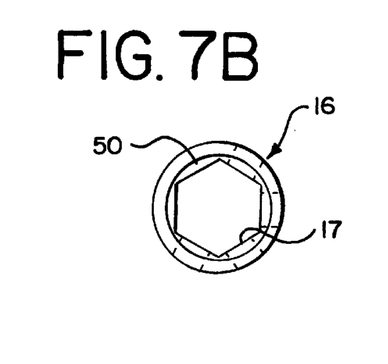
FIG. 7B is an end view of the rear housing of FIG. 7A taken along line 7B—7B.
Figure 7C:
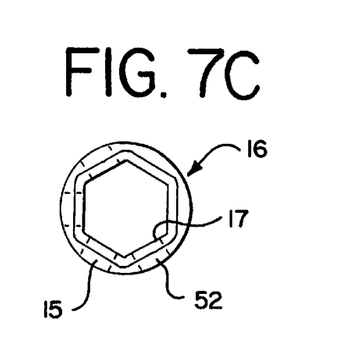
FIG. 7C is an end view of the rear housing of FIG. 7A taken along line 7C—7C.

The polygonal cross-section 82 of the outer tube 12 and the hexagonal shaped external circumference of the conductive inner body tube 14 preferably form an anti-rotational fit with the rear housing 16. The rear housing 16, as shown in FIGS. 7A–7C, has a hexagonal shaped inner passage 17 sized to receive the conductive inner body tube 14. As best shown in FIG. 3, the rear housing 16 has a polygonal shaped end 17 sized to fit within the polygonal cross-section end 82 of the outer tube 12. Although the inner body tube 14, inner passage 17, polygonal shaped end 15 of the rear housing, and polygonal cross-section end of the outer tube 12 are preferably hexagonal, other sets of matching shapes may be used to create an anti-rotational assembly of these components.

Referring again to FIGS. 6A–6B, a pitch rack 75 is mounted on a planar bevel 78 extending longitudinally along the exterior portion of the outer tube 80. The teeth 79 in the pitch rack 75 permit the entire automatic MIG welding torch, when assembled, to be precisely positioned during a welding operation by an external motorized assembly. The pitch rack 75 is detachably connected to the outer tube 80 via at least two non-threaded fasteners 77. In one preferred embodiment, the non-threaded fasteners 77 are blind hole hammer-in aluminum rivets. One suitable rivet is part number 38-104-06-13 manufactured by Southco Fasteners of Concordville, Pa. The fasteners 77 are preferably installed in pitch rack receiving holes 76 in the outer tube 80. The aluminum rivets also have thermal expansion properties similar to that of the outer tube and so will maintain a tight and robust connection between the outer tube 80 and pitch rack 75. Further, non-threaded fasteners are less likely to come loose than threaded fasteners.

Figure 6A:
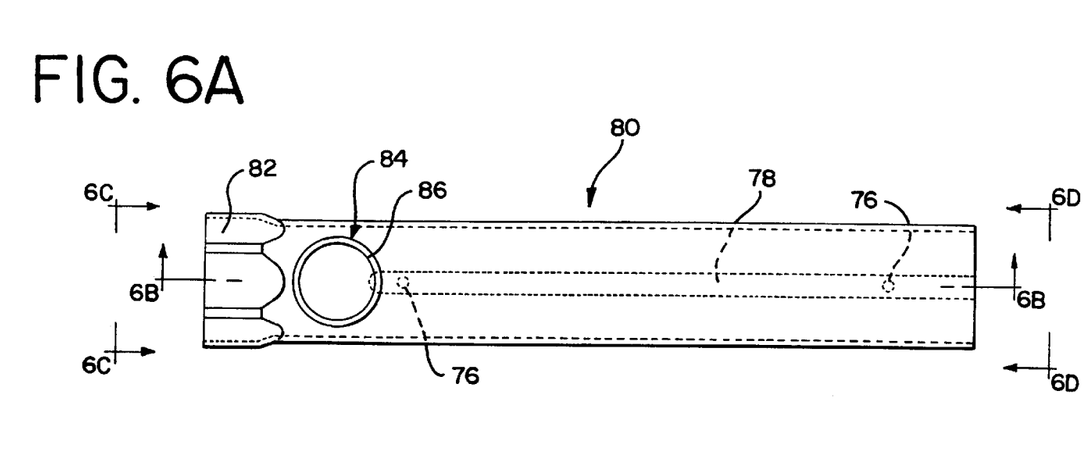
FIG. 6A illustrates a top plan view of a preferred outer tube for use with the automatic MIG welding torch assembly of FIG. 1.
Figure 6B:
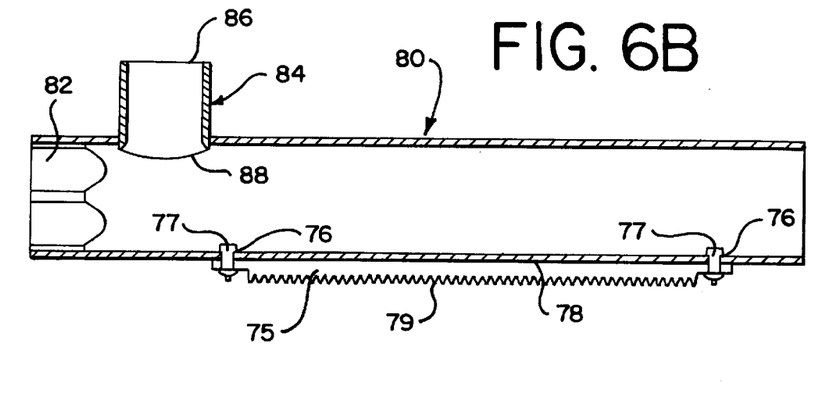
FIG. 6B is a side cross-sectional view of the outer tube of FIG. 6A taken along line 6B—6B showing a pitch rack attached.
Figure 6C:
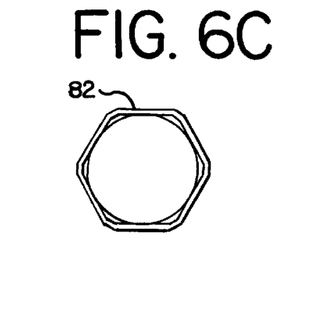
FIG. 6C is an end view of the outer tube of FIG. 6A taken along line 6C—6C.
Figure 6D:
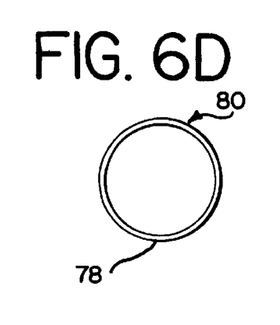
FIG. 6D is an end view of the outer tube of FIG. 6A taken along line 6D—6D.

Rivets, such as those identified above, provide the advantage of simple installation and removal with common hand-tools by users in the field. In one preferred embodiment, a user may install the pitch rack by aligning the pitch rack 75 over the receiving holes 76 positioned in the planar bevel 78 of the outer tube 80 and hammering in the rivets through the pitch rack and into the outer tube using a common hammer. Removal or replacement of a pitch rack is accomplished with a punch, pliers and a hammer. The rivets are first loosened using a hammer and a punch having a tip with a diameter smaller than the inner diameter of the rivets. A user then removes the rivets and pitch rack with a pair of pliers.

A preferred smoke collection exhaust port 84 positioned on the outer tube 80 is also illustrated in FIGS. 6A and 6B. Preferably, the exhaust port is a pipe having an evenly cut end 86 and a coped end 88. The coped end 88 is manufactured integrally with the wall of the outer tube 80 such that the coped end 88 matches the curvature of the inner wall of the outer tube. The flat end 86 of the smoke exhaust may be connected to a flexible tube or other port connected to a vacuum system.

Figure 8:
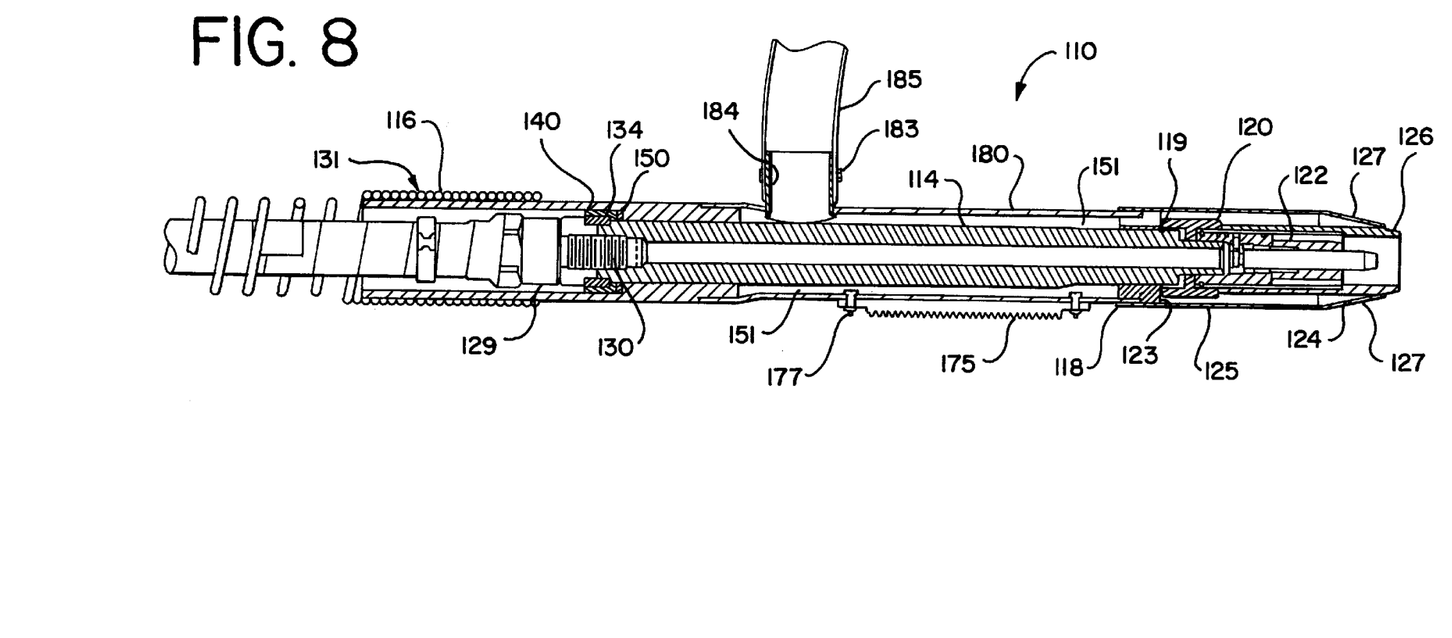
FIG. 8 is a cutaway side view of a preferred automatic MIG welding torch assembly with a smoke exhaust and pitch rack attached.

FIG. 8 shows an automatic MIG welding torch assembly 110 adapted to include the preferred smoke exhaust port 184. The conductive inner body tube 114 of the assembly 110 is attached to a cable end assembly 129 with a close nipple 130. The connection is secured with a lock ring 134 held in place by a lock ring bushing 140 as described above. The rear housing 116 is supported by a strain relief spring 131 at one end and is positioned between the outer tube 180 and inner body tube 114 at the other. A pitch rack 175 is attached to the outer tube 180 with non-threaded fasteners 177.

Figure 9A:
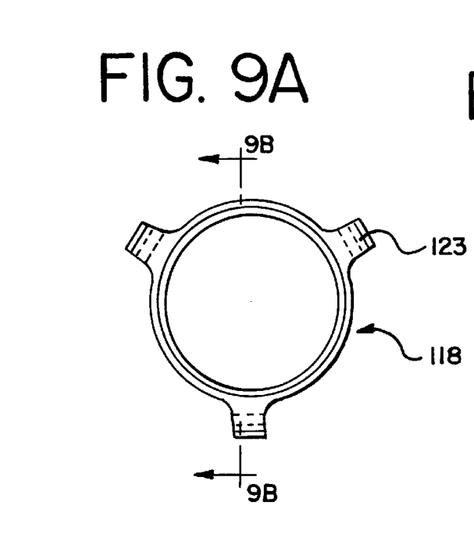
FIG. 9A is an end view of a preferred front spacer for use with the automatic MIG welding torch assembly of FIG. 8.
Figure 9B:
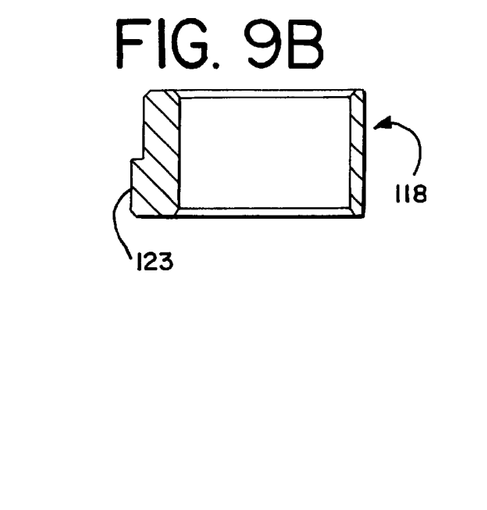
FIG. 9B is a cross-sectional view of the front spacer of FIG. 9A taken along line 9B—9B.

An external vacuum hose 185 attached to the exhaust port 184 via fasteners 183 draws welding smoke and particulates from the welding piece. The smoke and particulates are drawn through holes 127 in a smoke chamber 125 surrounding the nozzle 126, contact tip 124, welding head 122, and cap 120. The smoke and particulate matter pass over the retaining ring 119 and through a spacer 118 having multiple spokes 123, as shown in FIGS. 9A and 9B. The spacer 118 allows the smoke drawn through the smoke chamber 125 to flow into the air passageway 151 defined by the space between the conductive inner body tube 114 and the outer tube 180. The smoke and particulate matter is then drawn by the vacuum system (not shown) through the exhaust port 184 and out the attached vacuum hose 185.

Figure 10:
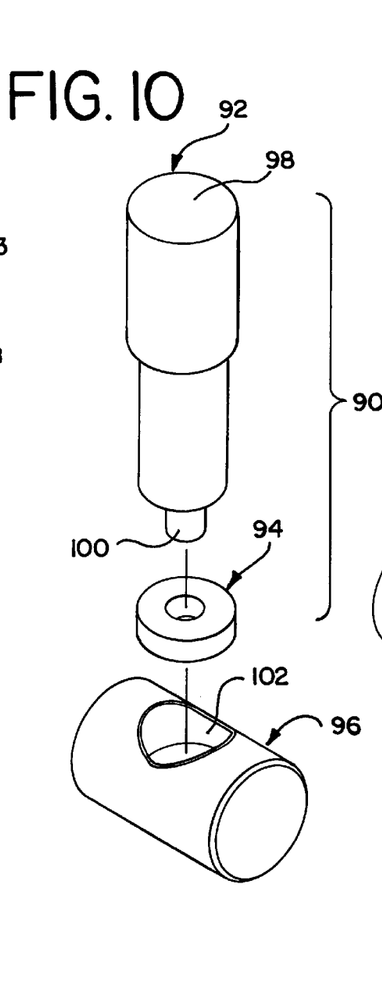
FIG. 10 is an exploded perspective view of a preferred two-piece punch and anvil tool for use in manufacturing an outer tube having a smoke exhaust.
Figure 11:
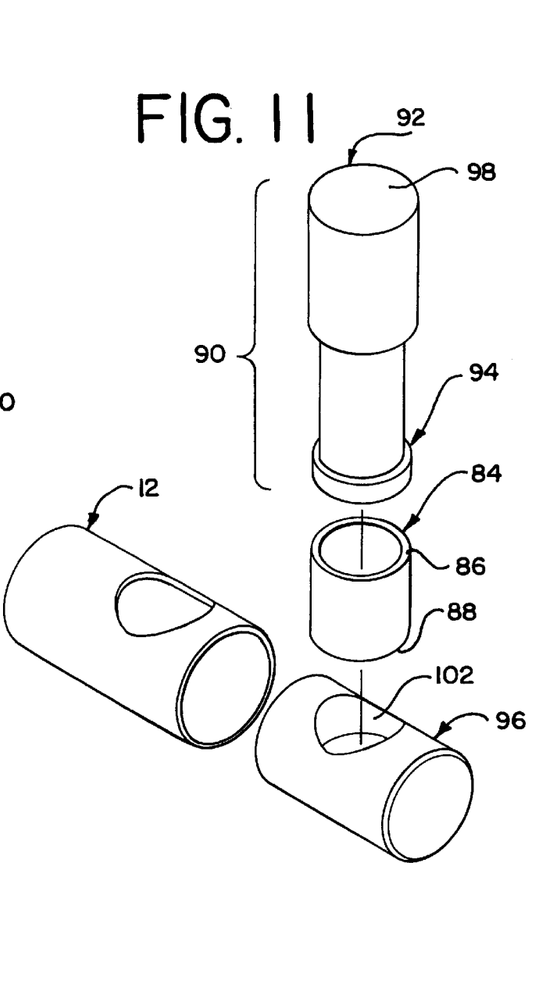
FIG. 11 is a side view of the two-piece punch and anvil of FIG. 10 being used to connect a smoke exhaust tube and outer tube.

As shown in FIGS. 10 and 11, a preferred method of manufacturing a smoke exhaust port on an outer tube for an automatic MIG welding torch is illustrated. FIG. 10 shows a two-piece punch 90 and anvil 96 used to attach a smoke exhaust to an outer tube. The two-piece punch 90 includes a punch handle 92 and a punch ring 94. The punch handle has a flat end 98 on one end and a punch ring peg 100 on the opposite end. The flat end 98 receives pressure applied from a standard hydraulic or manual arbor press when the punch 90 is in use. The punch ring peg 100 is designed to releasably and frictionally fit within the inner diameter of the punch ring 94. The punch handle 92 is sized to have a diameter at its widest point that is smaller than the inner diameter of the pipe being attached as a smoke exhaust. Conversely, the punch ring 94 is sized so that its outer diameter is slightly greater than the inner diameter of the pipe. In one preferred embodiment, the punch ring diameter is at least 2.9 percent greater than the inner diameter of the pipe to be attached. Other diameter ratios may be necessary for specific types of pipe material. In this manner, the punch ring 94 expands the pipe as the two-piece punch is forced through the pipe. The peg 100 fits into the inner diameter of the punch ring 94 to control the movement of the punch ring during the smoke exhaust fabrication process.

The anvil 96 is a cylindrical shaped object having a diameter slightly less than the inner diameter of the welding torch outer tube. Preferably, the two-piece punch 90 and anvil 96 are constructed out of a carbon steel material. The anvil, as shown in FIG. 11, is slidably positionable inside an outer tube that is to have a smoke exhaust attached. The anvil 96 includes a cylindrical cavity 102 formed perpendicular to the longitudinal axis of the anvil.

As is best shown in FIG. 11, a preferred method for fabricating a smoke exhaust in outer tube of a welding torch using a one step forming operation is shown. A user first inserts the anvil 96 into the outer tube. The cylindrical cavity 102 is aligned under a hole cut in the side of the outer tube. The smoke exhaust is next positioned through the hole over the anvil 96. The punch 90, with the punch ring 94 seated over the peg 100 of the punch handle 92, is then simply forced through the smoke exhaust in one step using a standard hydraulic or manual arbor press. The forced movement of the punch 90 through the smoke exhaust causes the smoke exhaust to expand into the hole cut in the outer tube. Once the punch ring 94 has passed through the hole in the outer tube, the punch ring 94 separates from the handle 92 and remains in the cylindrical cavity 102 of the anvil. The punch handle 92 is then withdrawn through the newly attach smoke exhaust and the anvil 96 is withdrawn through the outer tube carrying the punch ring 94.

An advantage of the two-piece punch is that it may be readily removed from the connected pipe without the need for the special extracting equipment that is needed with single piece punch tools. As is readily apparent, the two-piece punch and anvil may be sized according to the respective sizes of the pipes to be attached. Furthermore, other applications for attaching pipes, in addition to the preferred application of attaching a smoke exhaust to an outer tube in an automatic MIG welding torch, may be accomplished with the method and apparatus described above.

From the foregoing, an automatic MIG welding torch and method of assembly has been described. The welding torch includes a locking mechanism for easily and securely locking a power adapter to a conductive inner body tube such that simple field replacement of adapters or body tubes is possible. The inner body tube and outer tube are constructed to have an anti-rotational shape. A method of assembly and disassembly has been described that permits field replacement of parts in the welding torch assembly. The improved attachment of pitch racks and integral smoke exhaust in the outer tube described above also increase the functionality and flexibility of use of an automatic MIG torch. The foregoing features, as will be understood by one of ordinary skill in the art, are applicable to both air cooled and water cooled varieties of automatic MIG welding torches.

It is intended that the foregoing detailed description be regarded as illustrative rather than limiting, and that it be understood that the following claims, including all equivalents, are intended to define the scope of this invention.

We claim:

1. An automatic MIG welding torch assembly for use in automated welding environments comprising:
    an outer tube;
    a conductive inner body tube positioned inside the outer tube, said inner body tube having a power connection end and a welding tip end;
    at least one insulator positioned between the outer tube and the inner body tube; and
    a locking mechanism located at the power connection end of the inner body tube for securably and releasably connecting the inner body tube to a power adapter, said locking mechanism having a lock ring removably positioned around a connection formed by the power connection end and the power adapter and a lock ring bushing slidably movable in an axial direction along the conductive inner body tube and sized to frictionally fit over the lock ring.

2. The automatic MIG welding torch of claim 1 wherein the lock ring comprises two sections.

3. The automatic MIG welding torch of claim 2 wherein the two sections form a ring having an inner diameter designed to fit over the connection between the power connection end of the inner body tube and the power adapter.

4. The automatic MIG welding torch of claim 3 wherein the power connection end of the inner body tube and an end of the power adapter form a recessed circumferential area at the connection between the power adapter and the power connection end of the inner body tube for receiving the locking ring.

5. The automatic MIG welding torch of claim 4 wherein the recessed circumferential area comprises a hexagonal shape and the inner diameter of the lock ring is a hexagonal shape adapted to fit within the recessed circumferential area.

6. The automatic MIG welding torch of claim 2 wherein the lock ring bushing further comprises a lock ring receiving section for receiving the lock ring in a frictional fit whereby an anti-rotational connection is maintained between the inner body tube and the power adapter.

7. The automatic MIG welding torch assembly of claim 1, wherein the at least one insulator maintains an air gap between the outer tube and the inner body tube.

8. The automatic MIG welding torch assembly of claim 7, wherein the air gap comprises a circumferential air gap between the outer tube and the inner body tube and extending along at least a portion of a length of the inner body tube.

9. The automatic MIG welding torch assembly of claim 7, wherein the air gap further comprises a longitudinal air gap extending along at least a portion of a length of the inner body tube.

10. The automatic MIG welding torch assembly of claim 1 further comprising a threaded nipple for connecting the power connection end of the inner body tube to the power adapter.

11. The automatic MIG welding torch assembly of claim 1, wherein the at least one insulator comprises a first spacer constructed from an insulating material, the first spacer positioned at the power connection end of the inner body tube, and a second spacer constructed from an insulating material, the second spacer positioned at the welding tip end of the inner body tube.

12. A conductive inner body tube for use in an automatic MIG welding assembly, said inner body tube comprising:
    a hollow body having a power connection end and a welding tip connector on an opposite end; and
    said hollow body also having an inner circumference extending axially from the power connection end to the welding tip connector and a non-circular shaped external circumference extending along at least a portion of the inner body tube.

13. The conductive inner body tube of claim 12 wherein the non-circular shaped external circumference is hexagonal.

14. The inner body tube of claim 12 wherein the power connection end further comprises an internally threaded area for receiving a power adapter and an area of reduced diameter defining a recessed area on the external circumference of the inner body tube.

15. The inner body tube of claim 12 wherein the welding tip connector further comprises an externally threaded portion for connecting to a head and a nozzle and an annular groove for receiving a retaining ring.

16. The inner body tube of claim 12 further comprising an anti-spatter gas port connecting the inner circumference to the external circumference of the inner body tube.

17. The inner body tube of claim 16 further comprising a shielding gas port connecting the inner circumference to the external circumference of the body tube.

18. The inner body tube of claim 12, wherein the welding tip end further comprises a welding tip connector for connecting to a head and a nozzle, and wherein the welding tip end further comprises an annular groove for receiving a retaining ring.

19. The inner body tube of claim 12, wherein the power connection end further comprises an internally threaded area for receiving a cable end fitting assembly, and wherein the power connection end further comprises an area of reduced diameter defining a recessed area on the external circumference of the inner body tube.

20. In an automatic MIG welding assembly comprising a conductive inner body tube having at least one electrical insulator, the electrical insulator having a polygonal outer circumference and positioned around an outer circumference of the conductive inner body tube, an outer tube comprising:
   a hollow body having a substantially cylindrical shape and two open ends, the hollow body configured to receive the conductive inner body tube and the electrical insulator; and
   at least one of the open ends having a polygonal cross-section wherein the outer tube forms an anti-rotational fit over the polygonal outer circumference of the electrical insulator positioned inside the outer tube.

21. The outer tube of claim 20 further comprising a planar bevel extending longitudinally along the exterior portion of the outer tube for receiving a pitch rack.

22. The outer tube of claim 20 further comprising:
   a pitch rack mounted longitudinally on the exterior of the outer tube, said pitch rack detachably connected to the outer tube with at least two non-threaded fasteners.

23. The outer tube of claim 22 wherein the non-threaded fasteners are aluminum rivets.

24. The outer tube of claim 22 wherein the rivets are blind hole hammer-in aluminum rivets whereby a user may attach or detach the pitch rack with a hammer.

25. The outer tube of claim 22, wherein the at least two non-threaded fasteners are constructed of a non-magnetic metal material.

26. A method of assembling an automatic MIG torch by a user in the field comprising the steps of:
   attaching a power adapter to an inner body tube to form a connection; and
   securing a locking mechanism over the connection by placing a lock ring having two sections directly on the connection of the power adapter and the inner body tube, wherein the lock ring contacts the inner body tube and the power adapter, and sliding a lock ring bushing axially along the inner body tube to form a frictional fit over the lock ring.

27. The method of claim 25 further comprising the steps of;
   placing a spring against the locking mechanism;
   positioning a rear insulator housing against the spring;
   positioning an outer tube over the inner body tube and over at least a portion of the rear insulator housing;
   placing a front spacer between the inner body tube and the outer body tube; and
   placing a retaining fastener adjacent to the front spacer, whereby the automatic MIG torch is securely and releasably held together.

28. A method of attaching a pitch rack onto an outer tube of an automatic MIG welding torch assembly comprising the steps of:
   providing an outer tube, a pitch rack, and at least two non-threaded fasteners;
   aligning the pitch rack over receiving holes in the outer tube; and
   hammering the fasteners through the pitch rack and the outer tube whereby a secure and robust connection is formed between the pitch rack and outer tube.

29. An automatic MIG welding assembly comprising:
   an outer tube comprising a hollow body having a polygonal cross-section and two open ends;
   a conductive inner body tube coaxially disposed within the outer tube; and
   at least one insulator positioned between the outer tube and the inner body tube and maintaining a spaced relationship between the inner body tube and the outer tube.

\* \* \* \* \*